United States Patent [19]

Gotoh

[11] Patent Number: 4,977,486
[45] Date of Patent: Dec. 11, 1990

[54] ILLUMINATING DISPLAY DEVICE

[75] Inventor: Masaki Gotoh, Sendai, Japan

[73] Assignee: Alps Electric Co., Ltd., Tokyo, Japan

[21] Appl. No.: 457,907

[22] Filed: Dec. 27, 1989

[30] Foreign Application Priority Data

Apr. 25, 1989 [JP] Japan ............................... 1-47696[U]

[51] Int. Cl.$^5$ ............................................ G01D 11/28
[52] U.S. Cl. ........................................ 362/27; 362/31;
362/236; 362/800
[58] Field of Search ..................... 362/23, 26, 27, 30,
362/31, 32, 234, 235, 236, 800

[56] References Cited

U.S. PATENT DOCUMENTS

| | | | |
|---|---|---|---|
| 2,953,668 | 9/1960 | Bassett, Jr. | 362/27 X |
| 3,264,769 | 8/1966 | Hardesty | 362/27 X |
| 4,511,760 | 4/1985 | Garwin | 178/18 |
| 4,777,480 | 10/1988 | Okamoto et al. | 362/27 R |

Primary Examiner—Stephen F. Husar
Attorney, Agent, or Firm—Guy W. Shoup; Paul J. Winters

[57] ABSTRACT

An illuminating device including a first light source, a second light source and light guiding means, all provided behind an indicating panel having a first indicating area and a second indicating area formed adjacent to each other. The first light source is located at a position opposed to the first indicating area for illuminating the first indicating area. The second light source is so located as to illuminate the second indicating area through the light guiding means. The light guiding means is constructed of a transparent plate-like light guiding member for guiding light from the second light source to the second indicating area. The light guiding member is interposed between the indicating panel and the first light source. The light guiding member is capable of transmitting light from the first light source across a thickness of the light guiding member.

3 Claims, 2 Drawing Sheets

ILLUMINATING DISPLAY DEVICE

BACKGROUND OF THE INVENTION

The present invention relates to an illuminating device for illuminating two different indicating areas formed adjacent to each other by means of two different light sources, and more particularly to an illuminating device using light guiding means because of limitation of a mounting space for the light source.

In case of illuminating a function indicating area and an on/off indicating area therefor formed adjacent to each other on an indicating panel by using two kinds of light sources such as LEDs (light emitting diodes) capable of generating two different colors, the light sources are normally located in opposed relationship to the function indicating area and the on/off indicating area, respectively, and a light shielding wall is normally interposed between both the light sources. Particularly, in the case that a mounting space for the light source for illuminating the on/off indicating area, for example, cannot be defined because of a narrow space behind the indicating panel, the light source for illuminating the function indicating area is covered with a light shielding wall, and light guiding means such as a transparent acrylic light guiding member to be widely used for an on-vehicle equipment or the like is suitably provided in such a manner as to bypass the light shielding wall, so that the light from the light source for illuminating the on/off indicating area may be guided through the light guiding means.

In another case such that a small indicating area (e.g., the on/off indicating area) is independently formed in a large indicating area (e.g., the function indicating area) to be exposed to the outside, a light source for illuminating the small indicating area is normally covered with a light shielding wall, and a plurality of light sources for illuminating the large indicating area are provided so that a shade of the light shielding wall may not be visibly perceived. However, such a construction tends to generate ununiformity of brightness in the large indicating area and causes an increase in cost. Accordingly, it is effective also in this case to use a light guiding member passing through the light shielding wall and guide the light to the small indicating area.

However, such a prior art light guiding member bypassing the light shielding wall or passing therethrough has a complex shape to adversely effect a productivity and mountability.

SUMMARY OF THE INVENTION

It is accordingly an object of the present invention to provide an illuminating device which may guide the light through a light guiding member having a simple shape to a given indicating area in spite of a limited mounting space for a light source.

According to the present invention, there is provided in an illuminating device including a first light source, a second light source and light guiding means, all provided behind an indicating panel having a first indicating area and a second indicating area formed adjacent to each other, said first light source being located at a position opposed to said first indicating area for illuminating said first indicating area, said second light source being so located as to illuminate said second indicating area through said light guiding means; the improvement wherein said light guiding means comprises a transparent plate-like light guiding member for guiding light from said second light source to said second indicating area, said light guiding member being interposed between said indicating panel and said first light source, said light guiding member being capable of transmitting light from said first light source across a thickness of said light guiding member.

The transparent plate-like light guiding member is formed with tapering surfaces at predetermined positions for reflecting the light from the second light source and defining a light path to reach the second indicating area. Accordingly, the light from the second light source is guided through the light guiding member interposed between the indicating panel and the first light source to the second indicating area. Furthermore, since the light guiding member can transmit the light across the thickness thereof, the light from the first light source to the first indicating area is not cut by the light guiding member. Thus, the first and second indicating areas may be desirably illuminated by the first and second light sources, respectively. Further, as the light guiding member has a simple structure, the productivity and mountability may be improved to contribute to a reduction in cost.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
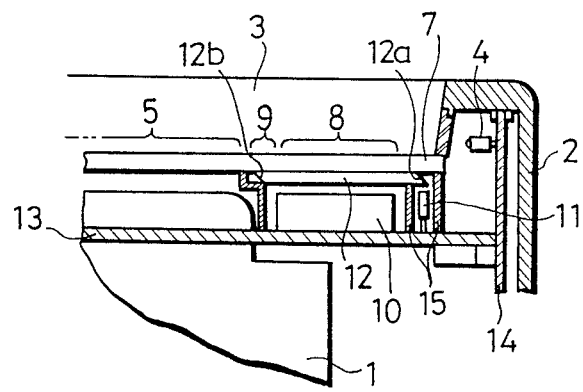
FIG. 1 is a horizontal sectional view of an essential part of a touch screen installing the illuminating device according to a first preferred embodiment of the present invention.
Figure 2:
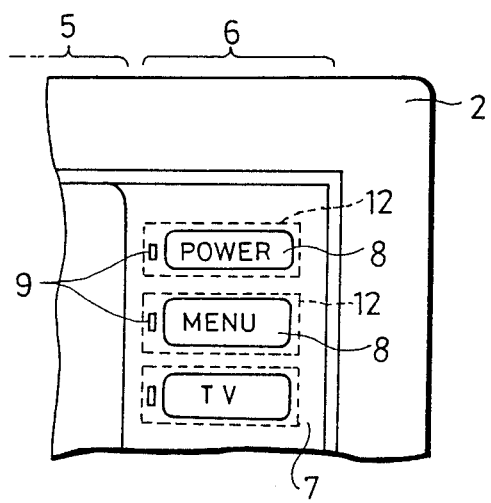
FIG. 2 is a front view of an indicating area to be illuminated by the illuminating device shown in FIG. 1.

Referring to FIGS. 1 and 2 which show a first preferred embodiment of the present invention, a touch screen as shown is mounted on a display device 1 such as CRT. A plurality of light emitting elements and light receiving elements are arranged in line around an opening 3 of a frame 2. A coordinate position on the touch screen can be identified by cutting a light path between the mating light emitting and light receiving elements 4 with a finger or the like. A coordinate detecting area 5 is formed in front of the display device 1, and a menu selecting area 6 for selecting an on/off state of a power supply and a picture image on the screen is formed in the vicinity of the coordinate detecting area 5. The menu selecting area 6 includes a plurality of function indicating areas 8 including different functional indications printed on an indicating panel 7 which also serves as an operating panel. The menu selecting area 6 also includes a plurality of on/off indicating areas 9 for indicating an on/off state of each function indicating area 8. A non-indicating portion of the menu selecting area 6 except the indicating areas 8 and 9 is masked, and each of the indicating areas 8 and 9 can be illuminated by LEDs 10 and 11 having different colors, respectively. More specifically, the LED 10 capable of coloring in green, for example, is located at a position opposed to the corresponding function indicating area 8 on the rear side of the indicating panel 7, while the LED 11 capable of coloring in red, for example, is located at a position where the light can be guided through a transparent plate-like acrylic light guiding member 12 to the corresponding on/off indicating area 9 because a space for mounting the LED 11 at a position opposed to the on/off indicating area 9 cannot be defined. The plate-like light guiding member 12 is mounted on the rear surface of the indicating panel 7 in opposed relationship to the indicating areas 8 and 9. The light from the LED 11 is reflected on a pair of tapering surfaces 12a and 12b formed at the opposite ends of the light guiding member 12, and is guided to the on/off indicating area 9. The light guiding member 12 can transmit light across the thickness thereof. Therefore, the light from the LED 10 to the function indicating area 8 is not cut by the light guiding member 12. Furthermore, there is no possibility that the lights from the LEDs 10 and 11 passing at right angles through the light guiding member 12 will interfere with each other. In FIG. 1, reference numerals 13 and 14 denote substrates, and reference numerals 15 denote light shielding walls.

As mentioned above, the transparent plate-like light guiding member 12 is mounted on the indicating panel 7. Accordingly, although the space for mounting the light source at the position opposed to the on/off indicating area 9 on the rear side of the indicating panel 7 cannot be defined, the light from the LED 11 can be guided through the light guiding member 12 to the on/off indicating area 9. The light from the LED 10 located behind the light guiding member 12 can be transmitted across the thickness of the light guiding member 12 to the function indicating area 8. Therefore, there is no problem in illuminating the function indicating area 8. With this arrangement, it is unnecessary to provide a light guiding member having a complex shape as required in the prior art, thus improving the productivity and mountability.

Figure 3:
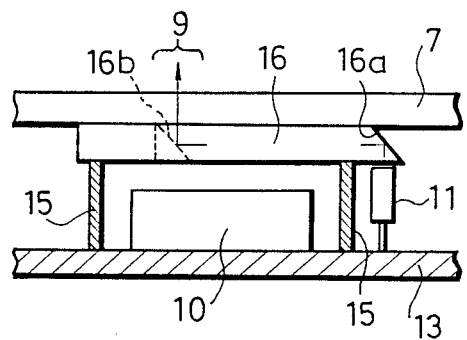
FIG. 3 is a view similar to FIG. 1, showing a second preferred embodiment of the present invention.
Figure 4:
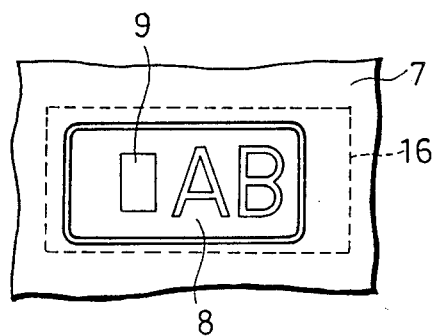
FIG. 4 is a view similar to FIG. 2, showing the second preferred embodiment.

Referring next to FIGS. 3 and 4 which show a second preferred embodiment of the present invention, wherein the same or corresponding parts as in the first preferred embodiment are designated by the same reference numerals, the on/off indicating area 9 is independently formed in the function indicating area 8 to be exposed from the indicating panel 7. The LED 11 for lighting the on/off indicating area 9 is located at a position where the light from the LED 11 is guided to the on/off indicating area 9 through a transparent plate-like light guiding member 16 having a pair of tapering surfaces 16a and 16b serving as light reflecting surfaces, rather than at a position opposed to the on/off indicating area 9. The light from the LED 10 can be transmitted to the indicating panel 7 through the light guiding member 16 across the thickness thereof except the tapering surface 16b, thereby uniformly illuminating the function indicating area 8 around the on/off indicating area 9. Accordingly, the overall structure of the illuminating device can be made simpler than the similar structure in the prior art, and the shape of the light guiding member can also be simplified.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an illuminating display device wherein a first light source is capable of illuminating a first display area and is positioned opposite to said first display area and wherein a second light source is capable of illuminating a second display area through a light guiding means, said first light source and said second light source arranged at a rear side of a display panel having said first display area and said second display area arranged therein, an improvement in which a transparent flat plate-like light guiding member for guiding light from said second light source to said second display area is placed between said display panel and said first light source, wherein the light from said second light source is reflected by a first tapered surface arranged at one end of said light guiding member and guided to said second display area by a second tapered surface arranged at the other end of said light guiding member and wherein at the same time said light guiding member allows the light of said first light source to pass through said light guiding member in a plate thickness direction.

2. An illuminating display device according to claim 1 in which said second display area is arranged within the first display area.

3. An illuminating display device according to claim 2 in which said second tapered surface is oppositely arranged in the second display area.

* * * * *